United States Patent [19]
Nara et al.

[11] 3,922,343
[45] Nov. 25, 1975

[54] ANTIBIOTIC XK-49-1-B-2 AND PROCESS FOR PRODUCTION THEREOF USING STREPTOSPORANGIUM VLOLACEOCHROMOGENES

[75] Inventors: Takashi Nara, Tokyo; Seigo Takasawa, Kawasaki; Ryo Okachi; Isao Kawamoto, both of Machida; Masahiro Kohagura; Itaru Takahashi, both of Shizuoka, all of Japan

[73] Assignee: Kyowa Hakko Kogyo Co., Ltd., Tokyo, Japan

[22] Filed: Sept. 4, 1973

[21] Appl. No.: 393,829

[30] Foreign Application Priority Data
Sept. 7, 1972   Japan................................ 47-89085

[52] U.S. Cl. ................................................. 424/116
[51] Int. Cl.² ......................................... A61K 35/00
[58] Field of Search ...................................... 424/116

[56] References Cited
UNITED STATES PATENTS
3,495,003   2/1970   Hausmann et al. ................ 424/116

Primary Examiner—Sam Rosen
Assistant Examiner—Daren M. Stephens
Attorney, Agent, or Firm—Fitzpatrick, Cella, Harper & Scinto

[57] ABSTRACT

The antibiotic XK-49-1-B-2 is produced by fermentation of microorganisms belonging to the genus Streptosporangium. The antibiotic is accumulated in the culture liquor and is recovered therefrom.

5 Claims, 2 Drawing Figures

ANTIBIOTIC XK-49-1-B-2 AND PROCESS FOR PRODUCTION THEREOF USING STREPTOSPORANGIUM VLOLACEOCHROMOGENES

BACKGROUND

The present invention relates to a new antibiotic, XK-49-1-B-2, and a process for producing the same. More particularly, the present invention relates to a process which comprises culturing a microorganism capable of producing XK-49-1-B-2 and belonging to the genus Streptosporangium in a suitable medium to form the new antibiotic XK-49-1-B-2, and recovering the antibiotic from the culture liquor.

The new antibiotic XK-49-1-B-2 is a water-soluble basic antibiotic which has very strong antibacterial activity against a broad range of Gram-positive and Gram-negative bacteria. It also possesses strong antibacterial activity against certain strains of *Staphylococcus aureus* and *Escherichia coli* which are resistant to various known antibiotics.

The present antibiotic is also active against Sarcoma 180 solid tumor and Ehrlich ascites tumor in mice.

In view of these antibacterial activities, XK-49-1-B-2 may be used as an antibiotic.

SUMMARY OF THE INVENTION

In accordance with the present invention, the antibiotic XK-49-1-B-2 is produced by fermentation of microorganisms belonging to the genus Streptosporangium. A particularly suitable microorganism belongs to the species *Streptosporangium violaceochromogenes*, which has been newly established by the present inventors. Its typical strain is *Streptosporangium violaceochromogenes* MK-49 which has been isolated from soil at the swamp area in Yoshioka-mura, Kitagunma-gun, Gunma-ken, Japan. This strain has been deposited with the American Type Culture Collection, Rockville, Maryland and has been accorded accession number 21807. The strain has the following microbiological properties.

I. Morphology:

Substrate mycelium develps well, branches, is 0.4 – 0.8 $\mu$ in diameter and has a septum.

Aerial mycelium is septate and 0.6 – 0.8 $\mu$ in diameter, and develops well straightly with simple branching. Almost no formation of loop form or spiral form of aerial mycelium is observed. Spherical sporangia are formed abundantly on the aerial mycelium. The sporangia are 4 – 9 $\mu$ in diameter. Sporangiophore is long and is 15 – 30 $\mu$ in length and approximately 0.6 – 0.8 $\mu$ in diameter.

Sporangiospores are arranged in a spiral form in each sporangium. They are oval or cylindrical, 0.8 – 0.9 $\mu$ × 1.2 – 1.6 $\mu$ in size, have a smooth surface and are without flagella and non-motile.

II. Cultural characteristics on various media:

Growth is generally very good on natural media. The substrate mycelium is gold and the aerial mycelium is white to pinkish white. Soluble, deep reddish violet pigments are formed on an agar medium. Growth is poor on synthetic media but aerial mycelium is produced abundantly in a powdery state.

Cultural characteristics on usually used various nutrient media after culturing at 27°C for 2 weeks are shown in Table 1. The color indications are given according to the classifications in Color Harmony Manual (Container Corporation of America).

Table 1

| Medium | Cultural characteristics on various media | | | | | |
|---|---|---|---|---|---|---|
| | Substrate mycelium | | Aerial mycelium | | Soluble pigment | |
| Czapek's agar | G: | Poor | G: | Moderate, powdery | | None |
| | C: | Colorless | C: | Shell Pink (5ba) | | |
| Glucose-asparagine agar | G: | Poor | G: | Moderate, powdery | | None |
| | C: | Colorless | C: | Shell Pink (5ba) | | |
| Nutrient agar | G: | Good | G: | Good | C: | Raspberry (9nc) |
| | C: | Orange (41a) | C: | White (a) | | |
| Egg albumin agar | G: | Poor | G: | Moderate, powdery | | None |
| | C: | Colorless | C: | Shell Pink (5ba) | | |
| Starch agar | G: | Poor | G: | Poor | | None |
| | C: | Colorless | C: | Shell Pink (5ba) | | |
| Yeast extract-malt extract agar | G: | Moderate | G: | Poor | | None |
| | C: | Gold (21c) | C: | White (a) | | |
| Oatmeal agar | G: | Moderate | G: | Good | C: | Dusty Yellow (1½gc) |
| | C: | Gold (21c) | C: | Shell Pink (5ba) | | |
| Glycerol-asparagine agar | G: | Poor | G: | Poor | | None |
| | C: | colonial Yellow Maize (2ga) | C: | White (a) | | |
| Bennett's agar | G: | Good | G: | Good | C: | Raspberry (9nc) |
| | C: | Melon Yellow (3ga) | C: | White (a) → Peach Pink (5ea) | | |
| Emerson's agar | G: | Good | G: | Good | C: | Raspberry (9nc) |
| | C: | Amber (3nc) | C: | White (a) | | |
| Glucose-yeast extract agar | G: | Good | G: | Good | | None |
| | C: | Colonial Yellow Maize (2ga) | C: | White (a) | | |

Table 1-continued

| Medium | Cultural characteristics on various media | | | | Soluble pigment |
|---|---|---|---|---|---|
| | Substrate mycelium | | Aerial mycelium | | |
| Peptone-iron agar | G:<br>C: | Poor<br>Mustard Gold (2ne) | G:<br>C: | Poor<br>White (a) | None |
| Tyrosine agar | G:<br>C: | Poor<br>Colonial Yellow Maize (2ga) | G:<br>C: | Moderate, powdery<br>Shell Pink (5ba) | None |

G: Growth  C: Color

III. Utilization of Carbon sources:
The utilization of carbon sources is shown in Table 2.

Table 2

| Carbon source | Utilization of Carbon sources | | |
|---|---|---|---|
| | Utilization | Carbon Source | Utilization |
| D-Arabinose | − | D-Mannitol | − |
| D-Galactose | + | D-Mannose | ++ |
| D-Glucose | ++ | D-Raffinose | − |
| Glycerol | + | L-Rhamnose | − |
| D-Lactose | − | Starch | ++ |
| D-Fructose | ++ | D-Xylose | + |
| D-Inositol | ± | Sucrose | + |

IV. Physiological properties:
1. Growth conditions: Growth is good under aerobic conditions. The growth temperature is 25° to 40°C with an optimum temperature of 30° to 37°C. The present strain grows at a pH range of 6.0 to 8.5 with an optimum pH of around 7.3.
2. Liquefaction of gelatin: No liquefaction is observed on gelatin medium by a stab culture (at 27°C for 2 weeks), but a slight liquefaction is observed after culturing for a longer period.
3. Action upon milk: Growth is poor and no change is observed after culturing at 27°C for 2 weeks. However, after about one month of culturing, coagulation and peptonization are observed.
4. Decomposition of cellulose: Negative
5. Hydrolysis of starch: Positive
6. Reduction of nitrate: Positive
7. Formation of tyrosinase: Negative
8. Chromogenic action: Negative The MK-49 strain forms spherical sporangia on aerial mycelium on an agar medium. The sporangiospores do not possess flagella and are non-motile and abundant sporangiospores are connected forming a spiral in a sporangium. From these morphological characteristics, the MK-49 strain is regarded to be a sporangium-forming actinomycete and, particularly, a strain belonging to the genus Streptosporangium. There have been reports on about 20 species belonging to the genus Streptosporangium. Although the systematic classification has not yet been established, the microorganisms of the genus Streptosporangium are classified into 4 main groups based on the color of aerial mycelium, i.e. pink group, greenish grey group, dark grey group and white group. The color of the matured aerial mycelium of the present strain is shell pink and, therefore, the present strain is classified into the pink group.

Seven species, that is, *Streptosporangium amethystogenes, streptosporangium longisporum, Streptosporangium nondiastaticum, Streptosporangium pseudovulgare, Streptosporangium roseum, Streptosporangium rubrum, Streptosporangium vulgare*, have been reported to belong to the pink group.

Table 3 shows the properties of the MK-49 strain in comparison with those of the above mentioned 7 species as reported in the literatures.

Table 3

| Micro-Organism | Sporangium | Sporangiospore | Substrate mycelium | Soluble pigments | Carbon Source | | Gelatin of nitrate | Milk | Reduction temp. | Growth |
|---|---|---|---|---|---|---|---|---|---|---|
| | | | | | Inositol | L-Rhamnose | | | | |
| Streptosporangium stogenes | 6–8μ | 1.0–1.3 ×1.5–1.9μ | Pale grey Yellowish brown Red | None amethy- | + | ± | − | + | + | |
| Streptosporangium longisporum | 7–13μ | 0.7×2.1μ | Bright red Brownish red | None | | | + | + | − | |
| Streptosporangium nondiastaticum | 10–15μ | 1.3×1.5μ | Pale yellow Brown | Pale yellow Brown | − | − | + | + | + | 42°C |
| Streptosproangium pseudovulgare | 7–10μ | 1.2×1.5μ | Pale brown Light brown | Pale yellow Brown | − | − | + | + | + | 42°C |
| Streptosporangium roseum | 5–9μ | 1.0–1.3 ×1.5–1.9μ | Reddish orange Pale yellow Pale pink | Purplish brown | + | + | + | + | + | |
| Streptosporangium rubrum | 6–11μ | 0.8–1.4μ spherical | Light red White Dirty white | None | | | − | + | ± | |
| Streptosporangium vulgare | 6–8μ | 1.0–1.2 ×1.5–1.9μ | Yellowish orange Orange Pale rose Gold | Pale yellow Yellow Rasp- | + | + | + | + | − | |

Table 3-continued

| Micro-Organism | Sporangium | Sporangiospore | Substrate mycelium | Soluble pigments | Carbon Source Inositol | Carbon Source L-Rhamnose | Gelatin of nitrate | Milk | Reduction temp. | Growth |
|---|---|---|---|---|---|---|---|---|---|---|
| MK-49 | 3.5–9μ | 0.8–0.9 ×1.2–1.6μ | Melon yellow | berry | ± | – | ± | + | + | |

In view of the formation of soluble pigments of raspberry color which is one of the characteristics possessed by the present strain, it is considered similar to *Streptosporangium roseum*. *Streptosporangium roseum* shows reddish orange to pale yellow substrate mycelium on well growing medium and produces soluble pigments of purplish brown color. On the other hand, the MK-49 strain forms gold to melon yellow substrate mycelium and produces soluble pigments of raspberry color, which show anti-bacterial activity against Gram-positive bacteria. In addition, the MK-49 strain does not utilize L-rhamnose while *Streptosporangium roseum* utilizes it. In view of these differences, the MK-49 strain is clearly distinct from *Streptosporangium roseum*.

Thus, the present strain was considered to belong to a new species and this new species was named *Streptosporangium violaceochromogenes* because of the characteristic soluble pigments.

As in the case with other actinomycetes, this strain can undergo mutation by artificial means such as ultraviolet ray irradiation, $Co^{60}$ irradiation, X-ray irradiation and various mutation-inducing chemicals. Accordingly, any strain even if thus mutated, can be used in the present invention so far as it has the ability to produce XK-49-1-B-2.

Generally, conventional methods for culturing actinomycetes may be employed in the process of the present invention. Various nutrient sources may be employed in the culturing medium. As a carbon source, glucose, starch, glycerol, mannose, fructose, inositol, mannitol, sucrose, molasses, etc. may be used alone or in combination. Further, hydrocarbons, alcohols, organic acids, etc., may be used depending upon the ability of utilization possessed by the microorganism. Inorganic and organic nitrogen sources such as ammonium chloride, ammonium sulfate, urea, ammonium nitrate, sodium nitrate, etc., and natural nitrogen sources such as peptone, meat extract, yeast extract, dry yeast, corn steep liquor, soybean meal, casamino acid, soluble vegetable protein, etc., may be used alone or in combination. In addition, such inorganic salts as sodium chloride, potassium chloride, calcium carbonate and various phosphates may be added to the medium if necessary. Furthermore, organic or inorganic materials capable of promoting growth of the microorganism and the production of XK-49-1-B-2 may be properly added thereto.

A liquid culturing method, especially a submerged stirring culturing method is most suitable for the present process. The culturing temperature is between 25° and 40°C and it is desirable to carry out culturing at an approximately neutral pH.

The antibiotic of the invention is formed and accumulated in the culture liquor usually after 5 to 15 days of culturing. When the yield of XK-49-1-B-2 in the culture liquor reaches a maximum, culturing is discontinued and the desired product is isolated and purified from the culture liquor after the microbial cells have been removed for example by filtration.

Isolation and purification of the antibiotic from the filtrate is carried out according to the methods usually used in the isolation and purification of microbial metabolic products from culture liquor.

Since XK-49-1-B-2 is basic and is well soluble in water but hardly soluble in organic solvents other than methanol and ethanol, the desired product can be purified by the methods usually used for the purifications of so-called water-soluble basic substances. More specifically, XK-49-1-B-2 may be purified by a proper combination of: adsorption and desorption from cation exchange resin and active carbon powders; column chromatography using cellulose, Sephadex (trade name) LH-20, Sephadex G-10, Sephadex G-25 and CM (carboxymethyl)-Sephadex C-25; adsorption and desorption from an ion exchange resin of porous type; and the like methods.

For example, the culture filtrate is first adjusted to a pH of 6.5 and then subjected to adsorption on cation exchange resin, Amberlite (trade name) IRC-50 ($H^+$ form). After washing with water, elution is carried out with 0.5N hydrochloric acid. The active fraction is neutralized and subjected to adsorption on Amberlite IRC-50 ($NH_4^+$ form). Elution is carried out with an aqueous 0.5M ammonium formate solution. The active fraction is subjected to adsorption on Amberlite IRC-50 ($H^+$ form) and elution is carried out with 0.5N hydrochloric acid. The active fraction obtained is neutralized with Dowex (trade name) 44 ($OH^-$ form) and then concentrated to dryness. The resulting dry product is dissolved in 50% methanol and the solution is passed through a column of Sephadex LH-20. Development and elution is carried out with 50% methanol. Upon drying the active fraction, a crude powder of greyish green is obtained. The thus obtained crude powder is dissolved in an aqueous solution of 0.1M ammonium formate. The resulting solution is subjected to adsorption on CM-Sephadex C-25 and elution is carried out by concentration gradient method with 0.1 – 1.0M ammonium formate. XK-49-1-B-2 is eluted out in a fraction where the concentration of ammonium formate is 0.30 – 0.35M. The fraction of XK-49-1-B-2 is subjected to adsorption on Amberlite CG-50 ($H^+$ form) and elution is carried out with 0.5N hydrochloric acid. The active fraction is adjusted to a pH of 6.5 with Dowex 44 ($OH^-$ form) and concentrated to dryness. The dry product is dissolved in 50% methanol and the solution is passed through a column of Sephadex LH-20. Development and elution is carried out with 50% methanol. The active fraction is concentrated. After adding acetone to the concentrate, the hydrochloride of XK-49-1-B-2 of blue color can be obtained.

THE ANTIBIOTIC

The hydrochloride of XK-49-1-B-2 is slightly bluish or greenish. It is well soluble in water, soluble in methanol, slightly soluble in ethanol and almost insoluble in such organic solvents as acetone, butanol, ethyl acetate, butyl acetate, ether and benzene. An elementary analysis reveals:

C : 32.13%, N : 14.20%, H : 6.34% and Cu : 3.4%. The substance does not exhibit definite melting point or decomposition point but is gradually decomposed at a temperature more than 190°C.

Figure 1:
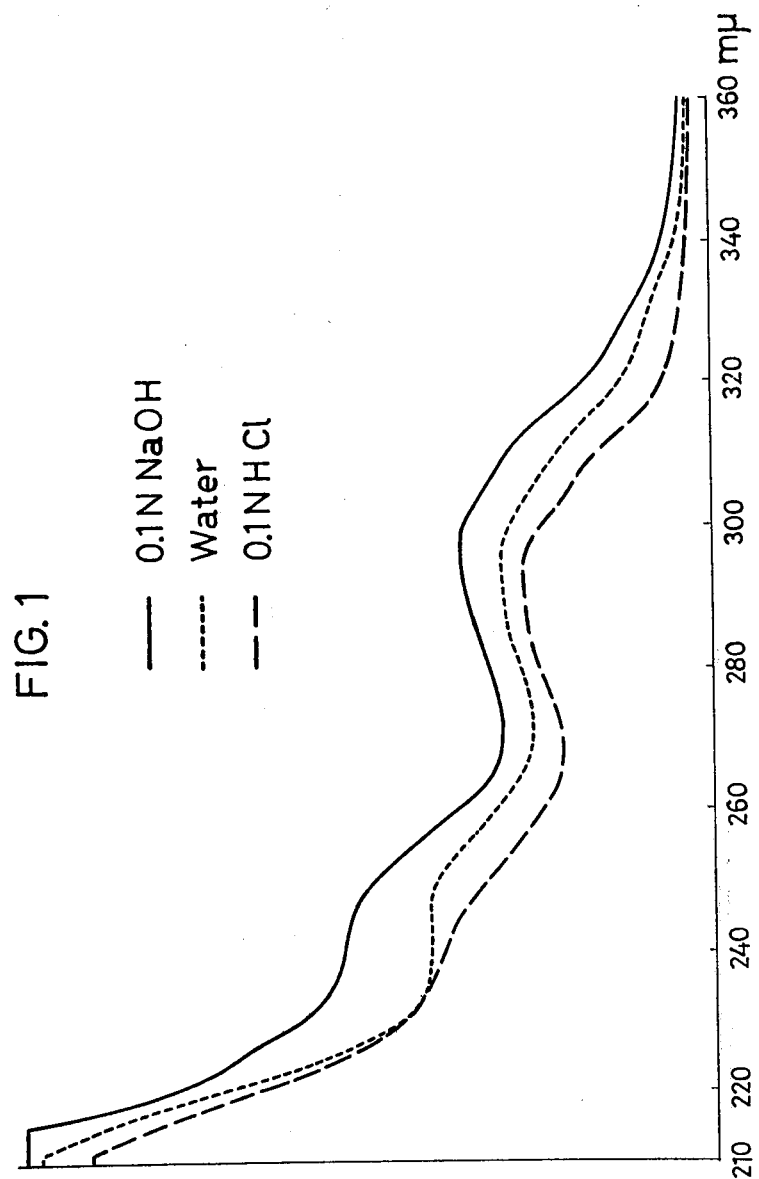
FIG. 1 illustrates the ultraviolet adsorption spectra of the hydrochloride of XK-49-1-B-2 in water, 0.1N HCl and 0.1N NaOH. This shows absorption maxima at 244 m$\mu$ and 293 m$\mu$.

3400, 3200(Sh), 2950, 1720, 1655, 1635, 1580-1550, 1520-1510(Sh), 1460, 1250, 1050, 1010, 980(Sh).

The hydrochloride of XK-49-1-B-2 gives positive reaction in Sakaguchi, Pauli and Ehrlich tests, negative reaction in ninhydrin test and weak reaction in a color test using potassium permanganate.

The Rf values of the hydrochloride of XK-49-1-B-2 obtained as a result of paper chromatography using various developers are shown in the following Table 4.

Table 4

Rf values of the hydrochloride of XK-49-1-B-2 by ascending paper chromatography

| Developer | Rf value | Developing period (hour) |
|---|---|---|
| 20% (W/V) Ammonium chloride | 0.75 | 3 |
| 10% (W/V) Ammonium chloride | 0.72 | 3 |
| 1% (W/V) Ammonium chloride | 0.40 | 3 |
| 0.5% (W/V) Ammonium chloride | 0.15 | 3 |
| Water-saturated n-butanol | 0.00 | 15 |
| n-Butanol-acetic acid-water (3:1:1 by volume) | 0.08 | 15 |
| Water-saturated ethyl acetate | 0.00 | 4 |
| Water-saturated n-butanol containing 2% (W/V)-p-toluenesulfonic acid and 2% (V/V) piperidine | 0.02 | 15 |

Based on the above described properties, the antibiotic of the present invention is compared with the known antibiotics. There has been no report on water-soluble basic antibiotics produced by the microorganisms of the genus Streptosporangium. It is apparent from the above that XK-49-1-B-2 is a water soluble, basic antibiotic which has amide bonds, contains copper and shows maximum absorptions at 244 m$\mu$ and 293 m$\mu$ in the ultraviolet spectra. As antibiotics having these characteristics, there have been known: Phleomycin (T. Ikekawa et al.: J. Antibiotics, Ser. A17: 194, 1964), bleomycin (H. Umezawa et al.: J. Antibiotics Ser. A19: 200, 1966; H. Umezawa et al.: J. Antibiotics Ser. A19; 210, 1966, U.S. Pat. 3,681,491), zorbamycin, zorbonomycin B, zorbonomycin C (A. D. Argoudelis et al.: J. Antibiotics 24: 543, 1971), YA56-X and YA56-Y (Y. Ito et al.: J. Antibiotics 24: 727, 1971). The ratio of the absorbancy at 244 m$\mu$ to that at 293 m$\mu$ in the ultraviolet absorption of XK-49-1-B-2 is 1.34, whereas the absorbancy ratios for phleomycin, zorbamycin, zorbonomycin C, YA56-X and YA56-Y are 2.89, 2.91, 2.77, 2.78 and 2.85, respectively. In view of this, XK-49-1-B-2 is differentiated from these antibiotics. The absorbancy ratios for bleomycin and Zorbonomycin B are 1.1 – 1.3 and 1.21, respectively. In this respect, XK-49-1-B-2 is similar to these antibiotics. As is known, there are bleomycin components designated as $A_1$, $A_2$, $A_3$, $A_4$, $A_5$, $A_6$, $B_1$, $B_2$, $B_3$, $B_4$ and $B_5$.

In the Sakaguchi test, XK-49-1-B-2 and the bleomycin B components show positive reaction, and all the A components show negative reaction. Additionally, XK-49-1-B-2 gives negative ninhydrin reaction, and bleomycin $A_4$, $A_5$ and $A_6$ gives a positive reaction. Thus, XK-49-1-B-2 and the antibiotics of the bleomycin A components are differentiated.

Furthermore, the Rf values of XK-49-1-B-2 are compared with those of bleomycin $A_2$, $A_5$, $B_2$ and $B_4$, and zorbonomycin B by silica gel thin layer chromatography using various developers. The results are shown in the following Table 5.

Table 5

Rf values of the hydrochloride of XK-49-1-B-2 and other antibiotics by silica gel thin layer chromatography

| Substance | Rf value Developer | | | |
|---|---|---|---|---|
| | 1 | 2 | 3 | 4 |
| XK-49-1-B-2 | 0.20 | 0.75 | 0.35 | 0.40 |
| Bleomycin $A_2$ | 0.28 | 0.46 | 0.55 | 0.08 |
| Bleomycin $A_5$ | 0.05 | 0.60 | 0.25 | 0.08 |
| Bleomycin $B_2$ | 0.54 | 0.80 | 0.78 | 0.10 |
| Bleomycin $B_4$ | 0.14 | 0.75 | 0.68 | 0.10 |
| Zorbonomycin B | 0.05 | 0.77 | 0.83 | 0.25 |

Developer 1 : Upper layer of chloroform-methanol-17% aqueous ammonia (2:1:1 by volume)
2 : 10% Ammonium acetate-methanol 1:1 by volume)
3 : Methanol-10% ammonium acetate-10% aqueous ammonia (10:9:1 by volume)
4 : 0.05M Citric acid buffer solution of pH 6.5

From the above Table 5, it is apparent that XK-49-1-B-2 is differentiated from bleomycin $B_4$ and Zorbonomycin B in the Rf values by silica gel thin layer chromatography. Also it is apparent from Table 5 that XK-49-1-B-2 shows the same Rf value as that of bleomycin $B_4$ when the developer is 10% ammonium acetate and methanol (1:1). It is disclosed in U.S. Pat. 3,681,491 that the Rf values of bleomycin $B_1$, $B_3$ and $B_5$ by the silica gel thin layer chromatography with the same solvent system, i.e. 10% ammonium acetate and methanol (1:1), are different from that of $B_4$ (Rf value of $B_4$ is 0.60, whereas Rf values of $B_1$, $B_3$ and $B_5$ are 0.75, 0.68 and 0.52, respectively). This demonstrates that XK-49-1-B-2 is also differentiated from bleomycin $B_1$, $B_3$ and $B_5$.

From the foregoing, XK-49-1-B-2 is found to be a new antibiotic different from any of the above-described antibiotics.

Antibacterial activity of XK-49-1-B-2 against various microorganisms is shown in Table 6.

Table 6

Antibacterial spectrum of XK-49-1-B-2 by agar dilution method

| Microorganisms tested | Minimum inhibitory concentration (mcg/ml) |
|---|---|
| Streptococcus faecalis ATCC 10541 | > 41.7 |
| Staphylococcus aureus ATCC 6538-P | 0.066 |
| Staphylococcus aureus KY 8942 (resistant to kanamycin, paromomycin and streptomycin) | > 4.2 |
| Staphylococcus aureus KY 8950 (resistant to streptomycin, tetracycline, penicillin and sulfonamide) | 0.26 |
| Staphylococcus aureus KY 8953 (resistant to streptomycin, kanamycin, paromomycin, tetracycline, neomycin, kanendomycin and erythromycin) | > 4.2 |

Table 6-continued

Antibacterial spectrum of XK-49-1-B-2
by agar dilution method

| Microorganisms tested | Minimum inhibitory concentration (mcg/ml) |
|---|---|
| *Staphylococcus aureus* KY 8956 (resistant to streptomycin, paromomycin, tetracycline, erythromycin and oleandomycin) | > 4.2 |
| *Staphylococcus aureus* KY 8957 (resistant to chloramphenicol, streptomycin, kanendomycin, tetracycline and paromomycin) | > 4.2 |
| *Bacillus subtilis* No. 10707 | 0.0011 |
| *Bacillus cereus* ATCC 9634 | 0.066 |
| *Bacillus cereus* var. *mycoides* ATCC 9463 | < 0.0001 |
| *Klebsiella pneumoniae* ATCC 10031 | 0.053 |
| *Escherichia coli* ATCC 26 | 0.004 |
| *Escherichia coli* KY 8302 (resistant to chloramphenicol, streptomycin, kanamycin, paromomycin, tetracycline and spectinomycin) | 0.26 |
| *Escherichia coli* KY 8310 (resistant to chloramphenicol, streptomycin, kanamycin, gentamicin, kanendomycin, paromomycin, tetracycline and spectinomycin) | 0.13 |
| *Escherichia coli* KY 8314 (resistant to streptomycin) | 0.26 |
| *Escherichia coli* KY 8315 (resistant to streptomycin, kanamycin, paromomycin and neomycin) | 0.033 |
| *Pseudomonas aeruginosa* BMH No. 1 | 10.4 |
| *Proteus vulgaris* ATCC 6890 | 1.32 |
| *Shigella sonnei* ATCC 9290 | 0.053 |
| *Salmonella typhosa* ATCC 9992 | 0.053 |

As is apparent from the foregoing, XK-49-1-B-2 has a very strong antibacterial activity against a broad range of Gram-positive and Gram-negative bacteria. XK-49-1-B-2 also has a strong antibacterial activity against certain strains of *Staphylococcus aureus* and *Escherichia coli* which are resistant to various known antibiotics.

The antibiotic of the present invention also exhibits an activity against Sarcoma 180 solid tumor in mice as illustrated by the following test.

Small portions of Sarcoma 180 solid tumor are transplanted subcutaneously into male mice of about 20 g body weight. To each of 10 mice transplanted with tumor, a solution containing 3 mg/kg of the test compound is administered intraperitoneally once daily for 8 days starting on the day following the transplantation.

As a control, an equal volume of saline is injected in the same manner as above. On the 10th day after the transplantation, the mice are sacrificed and the weight of tumor is measured. The ratio of average tumor weight of test animals to average tumor weight of control animals (T/C) is calculated. The results are shown in the following Table 7.

Table 7

| Test compound | Effect of XK-49-1-B-2 in mice bearing Sarcoma 180 (solid) | | |
|---|---|---|---|
| | Dose (mg/kg) | Average tumor weight on 10th day (g) | T/C |
| XK-49-1-B-2 (hydrochloride) | 3.0 × 8 | 0.36 | 0.12 |
| Bleomycin complex | 3.0 × 8 | 1.03 | 0.33 |
| Saline (control) | | 3.13 | — |

Likewise, the anti-tumor activity of XK-49-1-B-2 against Ehrlich ascites tumor in mice is tested.

In this test 0.5 ml (containing $10^6$ tumor cells) of diluted abdominal effusion is injected intraperitoneally into male mice of about 20 g body weight. The test compound solution is administered in a specified dose intraperitoneally to each of 10 mice injected with tumor cells once daily for 6 days starting on the day following the injection.

As a control, an equal volume of saline is injected in the same manner as above.

The mice are observed for 60 days. The ratio of average survival time of test animals to average survival time of control animals (T/C) is calculated. The results are shown in the following Table 8.

Table 8

| Test compound | Effect of XK-49-1-B-2 in mice bearing Ehrlich ascites | | | |
|---|---|---|---|---|
| | Dose (mg/kg) | Average body weight change on 10th day (g) | Average survival time (day) | T/C | Number of survivors on 25th day |
| XK-49-1-B-2 (hydrochloride) | 2.0×6 | −1.1 | >38.4 | >2.86 | 9/10 |
| Mitomycin C | 1.8×6 | +0.5 | 30.4 | 2.22 | 5/10 |
| Saline (control) | | 3.8 | 13.7 | — | 0/10 |

From the above Tables 7 and 8, it is demonstrated that XK-49-1-B-2 exhibits an excellent effect upon the inhibition of growth of Sarcoma 180 solid tumor and upon the survival of mice bearing Ehrlich ascites tumor. More specifically, XK-49-1-B-2 exhibits nearly 90% inhibition of Sarcoma 180 solid tumor in mice. Further, nine out of ten mice transplanted with Ehrlich ascited tumor survived by treatment with XK-49-1-B-2. Furthermore, XK-49-1-B-2 exhibits about 40 – 50% inhibition of growth of HeLa cells in tissue culture at a concentration of 1 mcg/ml.

Now, examples of the present invention will be given below, but these examples are mere illustrations of the present invention and will not restrict the present invention. In fact, various modification is possible within the spirit and scope of the present invention.

EXAMPLE 1

*Streptosporangium violaceochromogenes* MK-49 ATCC 21807 (FERM-P No. 1518) is used as a seed strain. As a first seed medium, a medium containing 2% glucose, 0.5% yeast extract, 0.5% peptone and 0.1% calcium carbonate (pH 7.2 before sterilization) is used.

One loopful of the seed strain is inoculated into 30 ml of the first seed medium in a 250 ml-Erlenmeyer flask and culturing is carried out at 30°C for 5 days with shaking. 30 ml of the seed culture liquor is inoculated into 300 ml of a second seed medium in a 2 l-Erlenmeyer flalsk provided with baffles. The composition of the second seed medium is the same as that of the first seed medium. The second seed culturing is carried out at 30°C for 2 days, with shaking. 1.5 l of the second seed culture liquor (corresponding to the content of 5 flasks) is inoculated into 15 l of a third seed medium in a 30 l-stainless steel jar fermenter. The composition of the third seed medium is the same as that of the first seed medium. Culturing in the jar fermenter is carried out at 30°C for 2 days with aeration of 15 l/min. and stirring at 350 r.p.m. 15 l of the third seed culture liquor is inoculated into 100 l of a fourth seed medium in a 300 l-fermenter. The composition of the fourth seed medium is the same as that of the first seed medium. Culturing in the fermenter is carried out at 30°C for 2 days with aeration of 100 l/min. and stirring at 150 r.p.m. Finally, 100 l of the fourth seed culture liquor is inoculated into 1000 l of a fermentation medium in a 3000 l-fermenter. The fermentation medium comprises 2% glucose, 0.1% yeast extract, 1.5% peptone and 0.1% calcium carbonate (pH 7.2 before sterilization). Culturing in the fermenter is carried out at 30°C for 12 days with aeration of 500 l/min. and stirring at 150 r.p.m. After 12 days of culturing, 0.5 mg/l of XK-49-1-B-2 is formed in the culture liquor.

EXAMPLE 2

100 l of the fourth seed culture liquor obtained in the same manner as described in Example 1 is inoculated into 1000 l of a fermentation medium in a 3000 l-fermenter. The fermentation medium comprises 2% glucose, 3% corn steep liquor and 0.1% calcium carbonate (pH 7.2 before sterilization). Culturing in the fermenter is carried out at 30°C for 12 days with aeration of 3000 l/min. and stirring at 150 r.p.m. After 11 days of culturing, the culture liquor exhibits an activity corresponding to that of 2 mg/l of XK-49-1-B-2.

EXAMPLE 3

1000 l of the fermentation liquor obtained in Example 1 is adjusted to a pH of 3 with concentrated hydrochloric acid. About 40 kg of a filter aid, Radiolite No. 600 (manufactured by Showa Kagaku Kogyo Co., Ltd.) is added to the culture liquor. Microbial cells and insoluble matters are removed by filtration. The filtrate is adjusted to a pH of 6.5 with a concentrated aqueous ammonia and passed through a column of about 50 l of a cation exchange resin, Amberlite IRC-50 ($H^+$ form). XK-49-1-B-2 is adsorbed on the resin. The resin is washed with water and elution is carried out with 0.5N hydrochloric acid. Active fraction is neutralized with Amberlite IR-4B ($OH^-$ form) and then passed through a column of 500 ml of Amberlite IRC-50 ($NH_4^+$ form). All the active substances are adsorbed on the resin. After washing the resin with water, impurities are eluted out with 0.3N aqueous ammonia. After the resin is washed again with water, elution is carried out with an aqueous 0.5M ammonium formate solution. A fraction containing XK-49-1-B-2 is obtained. The thus obtained fraction of XK-49-1-B-2 is diluted with about 4 volumes of water, adjusted to a pH of 6.5 with concentrated hydrochloric acid and passed through a column of 200 ml of Amberlite IRC-50 ($H^+$ form). The active substance is adsorbed on the resin. After washing the resin with water, elution is carried out with 0.5N hydrochloric acid. The active fraction is neutralized with Dowex 44 ($OH^-$ form) and then concentrated to dryness under reduced pressure. The concentrate is dissolved in a small amount of an aqueous 50% methanol solution and passed through a column of Sephadex LH-20 pretreated with an aqueous 50% methanol. Development and elution is carried out with an aqueous 50% methanol. The active fraction eluted is concentrated under reduced pressure. Upon adding 10 volumes of acetone to the concentrate, greyish green precipitates are obtained. Thus, 1.2 g of a dry powder is obtained. The activity of 1 mg of the powder corresponds to that of 200 mcg of the hydrochloride of XK-49-1-B-2.

EXAMPLE 4

950 l of the fermentation liquor obtained in Example 2 is adjusted to a pH of 5.0 with concentrated hydrochloric acid. About 40 kg of a filter aid, Radiolite No. 600 is added to the fermentation liquor and the mixture is subjected to filtration. The filtrate is passed through a column of 100 l of an ion exchange resin of porous type, HP 10. After washing the resin with water, an active substance is eluted out with a 50% aqueous methanol. The active fraction is concentrated. After adding about 10 volumes of acetone to the concentrate, about 50 g of a dark brown powder is obtained. The activity of 1 mg of the powder corresponds to that of 20 mcg of the hydrochloride of XK-49-1-B-2. The powder is dissolved in 200 ml of water and passed through a column of Amberlite IRC-50 ($NH_4^+$ form). Elution is carried out first with 0.3N aqueous ammonia followed successively by an aqueous 0.5 M ammonium formate solution and 0.5N hydrochloric acid. In this manner, a fraction containing XK-49-1-B-2 is obtained. The thus obtained fraction of XK-49-1-B-2 is subjected to purification using Amberlite IRC-50 ($H^+$ form) and Sephadex LH-20 in the same manner as described in Example 3. As the result, about 2.8 g of a greyish green powder is obtained. The activity of 1 mg of the powder corresponds to that of 200 mcg of the hydrochloride of XK-49-1-B-2.

EXAMPLE 5

500 mg of the crude powder of XK-49-1-B-2 obtained in Example 3 and Example 4 is dissolved in 50 ml of an aqueous 0.1M ammonium formate solution. The resulting solution is passed through a column of 30 ml of CM-Sephadex C-25. The active substance is adsorbed on the resin. After washing the resin with 300 ml of an aqueous 0.1M ammonium formate solution, concentration gradient elution is carried out with a total volume of 2 l of aqueous 0.1 to 1.0M ammonium formate solutions. XK-49-1-B-2 is eluted out in a fraction where the concentration of the solvent is 0.30 - 0.35M. The fraction of XK-49-1-B-2 is passed through a column of 20 ml of Amberlite CG-50 ($H^+$ form). After washing the resin with water, elution is carried out with 0.5N hydrochloric acid. The active fraction is adjusted to a pH of 6.0 with Dowex 44 ($OH^-$ form) and concentrated to dryness. The concentrate is dissolved in a small amount of an aqueous 50% methanol and passed through a column of Sephadex LH-20 pretreated with an aqueous 50% methanol. Development and elution is carried out with an aqueous 50% methanol. The active fraction eluted is concentrated. 10 volumes of acetone is added to the concentrate. Finally 56 mg of a blue powder of the hydrochloride of XK-49-1-B-2 is obtained.

Figure 2:
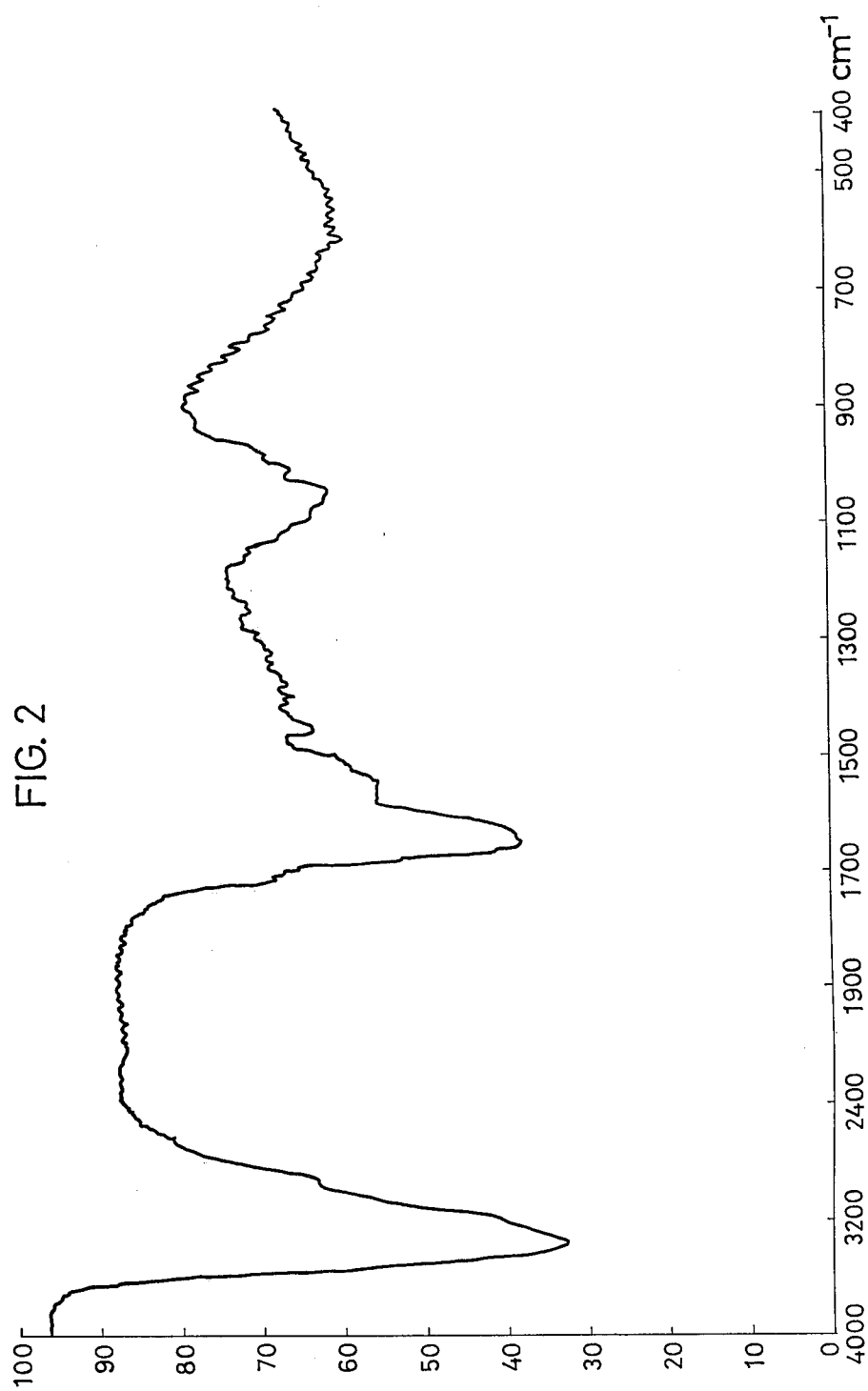
FIG. 2 illustrates the infrared absorption spectrum of the hydrochloride of XK-49-1-B-2 in KBr tablet. As is apparent from the figure, this substance shows peaks at the following wavelengths (cm$^{-1}$)

What is claimed is:

1. The antibiotic XK-49-1-B-2, the hydrochloride of which has the following characteristics:

a. elementary analysis: C: 32.13%, N:14.20%, H: 6.34% and Cu: 3.4%,
   b. ultraviolet absorption spectrum (water): essentially as shown in FIG. 1 with absorption maxima at 244 mµ and 293 mµ,
   c. infrared absorption spectrum: essentially as shown in FIG. 2 with major peaks at the following wavelengths (cm$^{-1}$): 3400, 3200(Sh), 2950, 1720, 1655, 1635, 1580-1550, 1520-1510(Sh), 1460, 1250, 1050, 1010, 980(Sh),
   d. Ratio of the absorbancy at 244 mµ to that at 293 mµ in the ultraviolet absorption (water): 1.34,
   e. color reaction: positive in Sakaguchi, Pauli and Ehrlich tests: negative in ninhydrin test,
   f. paper chromatography: Rf values as shown in Table 4,
   g. silica gel thin layer chromatography: Rf values as shown in Table 5.

2. The hydrochloride of the antibiotic XK-49-1-B-2 defined in claim 1.

3. A process according to claim 5 wherein said culturing is carried out at a temperature of from 25°C to 40°C and at about neutral pH.

4. A process for the production of the antibiotic XK-49-1-B-2, which comprises; culturing *Streptosporangium violaceochromogenes* ATCC 21807 in a nutrient medium at a temperature of from 25°C to 40°C and at about neutral pH; accumulating XK-49-1-B-2 in said medium; and recovering the antibiotic XK-49-1-B-2 therefrom.

5. A process for producing the antibiotic XK-49-1-B-2 which comprises culturing *Streptosporangium violaceochromogenes* ATCC 21807 in a nutrient medium containing assimilable sources of carbon and nitrogen until substantial antibacterial activity is detected in the culture liquor and recovering said antibiotic therefrom.

* * * * *